US007528509B2

(12) United States Patent
Ueda et al.

(10) Patent No.: US 7,528,509 B2
(45) Date of Patent: May 5, 2009

(54) MULTIFUNCTION-TYPE VIBRATION ACTUATOR AND MOBILE TERMINAL DEVICE

(75) Inventors: Minoru Ueda, Tokyo (JP); Satoshi Takeuchi, Kuroishi (JP); Etuo Oono, Yuzawa (JP)

(73) Assignee: Namiki Seimitsu Houseki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/592,958

(22) PCT Filed: Mar. 18, 2005

(86) PCT No.: PCT/JP2005/004910

§ 371 (c)(1),
(2), (4) Date: Sep. 15, 2006

(87) PCT Pub. No.: WO2005/091674

PCT Pub. Date: Sep. 29, 2005

(65) Prior Publication Data

US 2007/0194633 A1 Aug. 23, 2007

(30) Foreign Application Priority Data

Mar. 22, 2004 (JP) ............................ 2004-082330

(51) Int. Cl.
*H02K 41/00* (2006.01)
*H02K 35/00* (2006.01)
*H01F 7/08* (2006.01)
*G10K 9/00* (2006.01)

(52) U.S. Cl. ............................ 310/15; 310/12; 310/13; 310/14; 310/36; 381/398; 381/386

(58) Field of Classification Search ............ 310/12-15; 381/386, 398
See application file for complete search history.

(56) References Cited

U.S. PATENT DOCUMENTS

| | | | | |
|---|---|---|---|---|
| 6,208,237 | B1 * | 3/2001 | Saiki et al. | 340/388.1 |
| 7,212,647 | B2 * | 5/2007 | Kaneda et al. | 381/396 |
| 7,436,088 | B2 * | 10/2008 | Miura | 310/14 |
| 2003/0081807 | A1 | 5/2003 | Furuya | |

(Continued)

FOREIGN PATENT DOCUMENTS

EP 1315400 5/2003

(Continued)

OTHER PUBLICATIONS

International Search Report Application PCT JP 2005 004910 dated Jun. 28, 2005.

*Primary Examiner*—Quyen P Leung
*Assistant Examiner*—John K Kim
(74) *Attorney, Agent, or Firm*—Studebaker & Brackett PC; Donald R. Studebaker

(57) ABSTRACT

To accurately tune the vibration frequency of a suspension during assembly.

Secured positions 3*e* where a magnetic circuit part 2 is secured to a suspension 3 are provided near to each other. From among the secured positions 3*e*, secured positions 3*e* suitable for the characteristics of a suspension 3 to be mounted and the weight of a magnetic circuit part 2 are selected and secured to each other. Thus, the distance between the securing position and the central position of vibration of a suspension 3 and a housing 1 can be changed to tune the frequency to the desired value.

3 Claims, 3 Drawing Sheets

U.S. PATENT DOCUMENTS

| | | | | |
|---|---|---|---|---|
| 2004/0075351 | A1 | 4/2004 | Ueda et al. | |
| 2004/0081331 | A1 * | 4/2004 | Ando et al. | 381/398 |
| 2004/0146175 | A1 * | 7/2004 | Chung | 381/398 |
| 2006/0165249 | A1 * | 7/2006 | Sato | 381/374 |

FOREIGN PATENT DOCUMENTS

| | | |
|---|---|---|
| EP | 1459811 | 9/2004 |
| JP | 11-007286 | 1/1999 |
| JP | 2002-191092 | 7/2002 |
| JP | 2003-143676 | 5/2003 |
| JP | 2004-040612 | 2/2004 |
| WO | WO 03057375 | 7/2003 |

* cited by examiner

MULTIFUNCTION-TYPE VIBRATION ACTUATOR AND MOBILE TERMINAL DEVICE

TECHNICAL FIELD

This invention relates to a multifunction-type vibration actuator mounted on a mobile terminal device, such as a mobile phone and a small information communication terminal, and alerts a user to an incoming call with sound or vibration by one device and a mobile terminal device mounted with that actuator. More specifically, this invention relates to a multifunction-type vibration actuator of which a housing accommodates a magnetic circuit part, a suspension for elastically supporting the magnetic circuit part in the housing, a diaphragm arranged facing the magnetic circuit part, and a voice coil provided to the diaphragm and inserted into a magnetic gap of the magnetic circuit part, wherein an input of a signal with a vibration frequency to the voice coil allows vibration of the suspension securing the magnetic circuit part to be transmitted outward through the housing.

BACKGROUND ART

Conventionally, this type of multifunction-type vibration actuator has a yoke (magnetic yoke) where a magnetic circuit part is fitted and secured in a central opening of a suspension, and a plurality of equally spaced tongues provided to an outer periphery of the suspension are fitted and bonded in stepped notches inside a frame of a housing (enclosure) in order to secure the outer periphery to the housing. (See, for example, Patent Reference 1). In this actuator, input of voice signal current to the voice coil initiates vibration of the diaphragm to generate a sound, such as an incoming call alert, melody, voice, or music, and input of a signal with a vibration frequency initiates vibration of mechanical vibration systems consisting of the magnetic circuit part and the suspension to transmit this vibration throughout a mobile terminal device mounted with this multifunction-type vibration actuator through the housing. Moreover, we find another multifunction-type vibration actuator in which a yoke (lower yoke) of a magnetic circuit part is fitted and secured in a central opening of a suspension (leaf spring) by laser welding and an outer periphery of the suspension is inserted and secured between a housing (case) and a spacer fitted inside the housing. (See, for example, Patent Reference 2.)

[Patent Reference 1] JP2002-191092 A (FIGS. 8-11 on Page 2)

[Patent Reference 2] JP11-7286A (FIGS. 2 and 3 on Page 3-5)

DISCLOSURE OF THE INVENTION

Problem Solved by the Invention

In this type of multifunction-type vibration actuator, it is necessary to precisely control the characteristics of the suspension and a vibration body consisting of the magnetic circuit part and suspension in order to accurately tune the vibration frequency of the suspension. The characteristics of the suspension vary depending on the slight difference in materials or dimensional accuracy for each manufacturing lot, and the weight of a magnet or a yoke configuring the magnetic circuit part also varies slightly depending on the dimensional accuracy for each manufacturing lot. In a conventional multifunction-type vibration actuator, however, since the suspension is bonded to the magnetic circuit part with adhesive or by laser welding in the desired position, the distance between this bonding position and the secured position of the suspension in the housing is always constant. Thus, it was difficult to tune the vibration frequency of the suspension in the assembly stage. As a result, a shift in the vibration frequency from the targeted value lowers the acceleration during actual operation, and variation in part processing accuracy destabilizes the quality of the finished product, leading to high manufacturing costs.

The invention according to Claim 1 and the invention according to Claim 3, quoting Claim 1 among these inventions, have the purpose of accurately tuning the vibration frequency of the suspension during assembly. The invention according to Claim 2 and the invention according to Claim 3, quoting Claim 2, have the purpose of enabling rapid and accurate positioning while realizing a simple tuning construction in addition to the purpose of the invention according to Claim 1.

Means for Solving the Problem

In order to achieve the aforementioned purposes, the invention according to Claim 1 among these inventions provides a multifunction-type vibration actuator, wherein a plurality of secured positions for the magnetic circuit part and the suspension are prepared so as to be close to each other, and a distance between the secured position and a central vibration position of the suspension and the housing is changed by selecting secured positions suitable for a characteristic of the suspension to be mounted and suitable also for a weight of the magnetic circuit part from the secured positions and by using the secured position. The invention according to Claim 2 provides a multifunction-type vibration actuator, wherein the configuration of the invention according to Claim 1 is added with a configuration where the above-described secured positions are through-holes for laser welding opened in a suspension and laser welding is performed by changing the laser radiation positions toward the through-holes. The invention according to Claim 3 provides a mobile terminal device incorporating a multifunction-type vibration actuator according to Claim 1 or 2, wherein receiving a call-out signal initiates vibration of the diaphragm and one or both mechanical vibration systems, consisting of a magnetic circuit part and a suspension in order to transmit the vibration of the mechanical vibration systems throughout a device through a housing and reset of the call-out signal, stops vibration of the diaphragm and the mechanical vibration systems.

Effects of the Invention

In the invention according to Claim 1 and the invention according to Claim 3, quoting Claim 1, among these inventions, a plurality of secured positions for the magnetic circuit part and the suspension are prepared so as to be close to each other, and a distance between the securing planned position and a central vibration position of the suspension and the housing is changed by selecting secured positions suitable for a characteristic of the suspension to be mounted and suitable also for a weight of the magnetic circuit part from the secured positions and by using the secured position in order to enable tuning to the desired frequency. Therefore, it is possible to accurately tune the vibration frequency of the suspension during assembly. As a result, variation in the accuracy of parts for the suspension or the magnetic circuit part, depending on each manufacturing lot, is restricted to stabilize the quality of the finished product, leading to a reduction in the manufacturing costs.

In the invention according to Claim 2 and the invention according to Claim 3, quoting Claim 2, laser welding is performed by changing the laser radiation positions toward the through-holes 3*e* in order to enable rapid and accurate positioning while realizing simple tuning construction in addition to the effect of the invention according to Claim 1. Therefore, it is possible to perform rapid and accurate positioning while realizing a simple tuning construction. As a result, the manufacturing costs can be further reduced.

Best Mode for Carrying out the Invention

Now, an embodiment of the invention is described based on drawings. In a multifunction-type vibration actuator A according to the invention, a cylindrical housing 1 accommodates a magnetic circuit part 2, a suspension 3 for elastically supporting a magnetic circuit part 2 upward, a diaphragm 4 facing a magnetic circuit part 2, and a voice coil 5 bonded to a diaphragm 4 and inserted into an annular magnetic gap 2*a* of a magnetic circuit part 2 as shown in FIGS. 1 through 5, and input of a voice signal to a voice coil 5 initiates low vibration of a diaphragm 4 to generate a sound, such as an incoming call alert, melody, voice, or music, and an input of signal current with a vibration frequency of 120-160 Hz initiates high vibration of heavy mechanical vibration systems consisting of a magnetic circuit part 2 and a suspension 3.

A housing 1 is a cylindrical enclosure for accommodating a magnetic circuit part 2, on an open end 1*a* (the top in the drawing) of which an outer peripheral portion 4*a* of a diaphragm 4 is bonded with adhesive, and another open end 1*b* (the bottom in the drawing) is detachably provided with and covered by a bottom cover 6.

An outer circumferential portion 3*a* of a suspension 3 bonded to a magnetic circuit part 2 and an elastically deformable annular member 7 are inserted between the other open end 1*b* of a housing 1 and a cover 6 in order to press an outer circumferential portion 3*a* of a suspension 3 onto the other open end 1*b* of a housing 1.

This annular member 7 is an O-ring made of an elastic material, such as synthetic rubber, and arranged along an outer periphery at the bottom of a cover 6 facing an outer circumferential portion 3*a* of a suspension 3 as shown in FIGS. 1, 3 and 5. Furthermore, it is preferable to select an optimum annular member 7 from those with different thicknesses and hardness numbers.

Fitting portions of a housing 1 and a cover 6 are provided with an engaging means 8 for securing the positioning. In this embodiment, a lower peripheral side wall 1*c* is formed so as to be fitted in a side peripheral wall 6*a* of a cylindrical cover 6 with a bottom and a plurality of engaging protrusions 8*a* and engaging slits 8*b* as the aforementioned engaging means 8 are provided to these fitting surfaces for each circumferentially and equally spaced location as shown in FIGS. 3 and 5.

Although an outer diameter of a lower peripheral side wall 1*c* of a housing 1 is designed slightly smaller than an inner diameter of a side peripheral wall 6*a* of a cover 6 to fit to each other, the engaging protrusions 8*a* are provided to an outer surface of a lower peripheral side wall 1*c* of a housing 1, and the engaging slits 8*b* are penetratingly provided to an inner surface of a side peripheral wall 6*a* of a cover 6 as shown in the drawing, the fitting construction and the shape of an engaging means 8 are not limited to those shown in the drawing, and other constructions and shapes, for example, arrangement of the engaging protrusions 8*a* and the engaging slits 8*b* opposite to that shown in the drawing, are acceptable if similar functions are available.

A suspension 3 is an annular leaf spring to the central section of which a central opening 3*b* to be fitted to a magnetic circuit part 2 to be described later, an annular portion 3*c* surrounding this central opening 3*b* in contact with a magnetic circuit part 2, and a deflectable arm 3*d* communicating the annular portion 3*c* and an outer circumferential portion 3*a* are provided, wherein the annular portion 3*c* is integrally bonded to a magnetic circuit part 2 by laser welding, and an outer circumferential portion 3*a* is secured to the other open end 1*b* of a housing 1 to elastically support a magnetic circuit part 2 at the position facing a diaphragm 4.

More specifically, a plurality of through-holes 3*e* for allowing a laser for laser welding to pass through are opened at each equally spaced location in a plurality of places of the annular portion 3*c* as secured positions in advance as shown in FIGS. 4 and 5, the through-holes 3*e* suitable for the characteristics of a suspension 3 to be mounted and the weight of a magnetic circuit part 2 are selected from these plurality of through-holes 3*e*, and laser welding is performed while changing laser radiation positions toward them to change the distance between these laser welding positions and an outer circumferential portion 3*a* of a suspension 3 secured to the other open end 1*b* of a housing 1, namely the central position of vibration, in order to accurately tune the vibration frequency of a suspension 3 to the desired value.

A diaphragm 4 is a vibration plate formed as a circular plate with an appropriate thickness made from an elastic plastic film material, such as polycarbonate, polyetherimide, polyimide, and polyethylene terephthalate. An annular rising portion 4*b* is formed by bending a portion close to the outer periphery along the inner peripheral surface of a housing 1, and an outer peripheral portion 4*a* extending from this rising portion 4*b* is formed in parallel with a flat surface of the other open end 1*a* of a housing 1.

An annular mounting portion 4*c* is formed in a diaphragm 4 almost in the middle between the center and the outer periphery of a diaphragm 4, an end surface of a voice coil 5 is bonded to the back face of the mounting portion 4*c* with adhesive and inserted into an annular magnetic gap 2*a*, and concentric curved surfaces 4*d* and 4*e* swelling outward are formed by bending at the center section and the outer periphery section separated by the coil mounting portion 4*c*.

A voice coil 5 is cylindrically wound of which lead wires 5*a* are bonded on the back face of the aforementioned diaphragm 4 with adhesive to avoid the effect of vibration as shown in FIG. 2. The distal ends of these lead wires 5*a* are pulled out toward a terminal block 1*d* provided to the outside of a housing 1 and are electrically connected to a terminal plate 1*e* provided to the terminal block 1*d* by soldering or bonding.

The above-described magnetic circuit part 2 is configured by concentrically stacking a yoke 9, a disk-like magnet 10, and a disk-like pole piece 11.

A yoke 9, made of a magnetic material, is formed as a cylinder with a bottom. The outer peripheral surface 9*a* thereof is formed to provide a small gap (for example, 0.05-0.2 mm) with the inner peripheral surface of a housing 1. A contact surface 9*b* facing the annular overhang wall 1*f* formed in the inner peripheral surface of a housing 1 is in contact with the overhang wall 1*f* during vibration of a magnetic circuit part 2 to restrict movement of a magnetic circuit part 2 caused by an external shock force.

Furthermore in this embodiment, the bottom of a yoke 9 is provided with a raised surface 9*c* fitting into the central opening 3*b* of a suspension 3, and the annular portion 3*c* of a suspension 3 is in contact with and integrally bonded to a support surface 9*d* formed around the raised surface 9*c* with adhesive. A counter bore (not illustrated) with a diameter slightly larger than a magnet 10 can be provided in order to position a magnet 10 at the center of the bottom if necessary.

A pole piece 11 is formed as a disk with a diameter equal to or larger than a magnet 10. The bottom thereof can be provided with a counter bore (not illustrated) with a diameter slightly larger than a magnet 10 for positioning if necessary. It is preferable that a magnet 10 is retained between this counter bore and the counter bore of a yoke 9 to restrict a radial shift of a magnet 10.

Now, the assembly procedures of a multifunction-type vibration actuator A are sequentially described. First, a diaphragm 4 and a voice coil 5 are integrally installed to a housing 1, a suspension 3 is bonded to a yoke 9 of a magnetic circuit part 2 so as to be integral with the whole magnetic circuit part 2, an annular member 7 is inserted into a cylindrical cover 6 with a bottom, and a member 7 is placed along a side peripheral wall 6*a* as shown in FIG. 3

When a yoke 9 of a magnetic circuit part 2 is bonded to an annular portion 3*c* of a suspension 3 by laser welding, it is necessary that the characteristics of a suspension 3 to be mounted and the weight of a magnetic circuit part 2 are examined, suitable through-holes 3*e* are selected, laser welding is performed by changing the laser radiation positions toward these through-holes, and the distance between this laser welding position and the central position of vibration of a suspension 3 and the housing is appropriate in order to accurately tune the vibration frequency of a suspension 3 to the desired value. As a result, it is possible to accurately tune the vibration frequency of a suspension 3 to the desired value during assembly.

An outer circumferential portion 3*a* of a suspension 3 integrally installed to a magnetic circuit part 2 is stacked on this annular member 7, a housing 1 mounted with a diaphragm 4 and a voice coil 5 is placed over them, and an outer circumferential portion 3*a* of a suspension 3 and an annular member 7 are inserted between the other open end 1*b* and the aforementioned cover 6.

Thus, the lower peripheral side wall 1*c* of a housing 1 is positioned close to the side peripheral wall 6*a* of a cover 6 to be fitted with each other, the engaging protrusions 6*a* and the engaging slits 6*b* of an engaging means 8 provided to these walls are fitted and engaged with each other, and all the parts consisting of a housing 1, magnetic circuit part 2, suspension 3, diaphragm 4, voice coil 5, cover 6, and annular member 7 are integrally assembled to complete the assembly.

Therefore, a suspension 3 can be secured to a housing 1 without using adhesion, molding, or welding, and a shock force from the outside of a housing 1 can be absorbed by compressive deformation of an annular member 7. As a result, fluctuation of characteristics caused by a shock force from dropping can be prevented, and the characteristics of the vibration frequency can be flattened while reducing man-hours and costs. Moreover, changing the size or hardness of an annular member 7 results in the change in the pressure acting on an outer circumferential portion 3*a* of a suspension 3, leading to easy tuning of the resonant frequency.

The invention is not limited to the aforementioned embodiment where a magnetic circuit part 2 is elastically supported by a suspension 3 upward. That is to say, a similar operational effect can be obtained even if the positional relationship between a magnetic circuit part 2 and a suspension 3 is changed such that a suspension 3 hangs a magnetic circuit part 2 to support a magnetic circuit part 2. The construction and the shape of a housing 1, magnetic circuit part 2, suspension 3, diaphragm 4, voice coil 5, cover 6, and annular member 7 are not limited to those shown in the drawings. Only if functions similar to the above are available, any other construction and shape can be applied.

DESCRIPTION OF REFERENCE CHARACTERS

Figure 1:
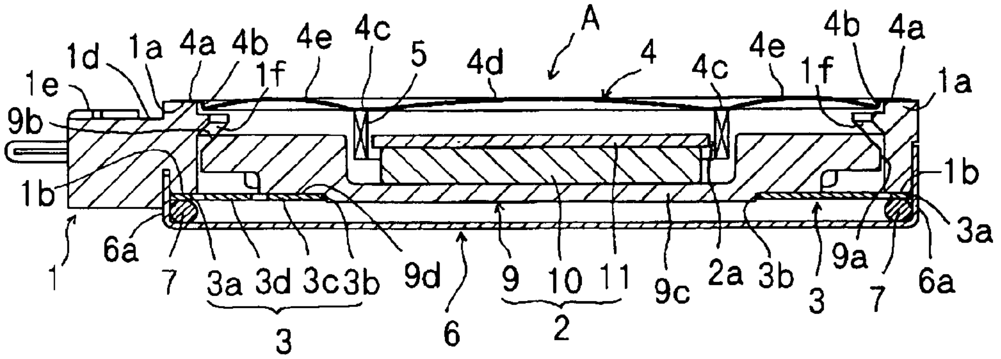
FIG. 1 is a cross-sectional front view of a multifunction-type vibration actuator showing one embodiment according to the invention.
Figure 2:
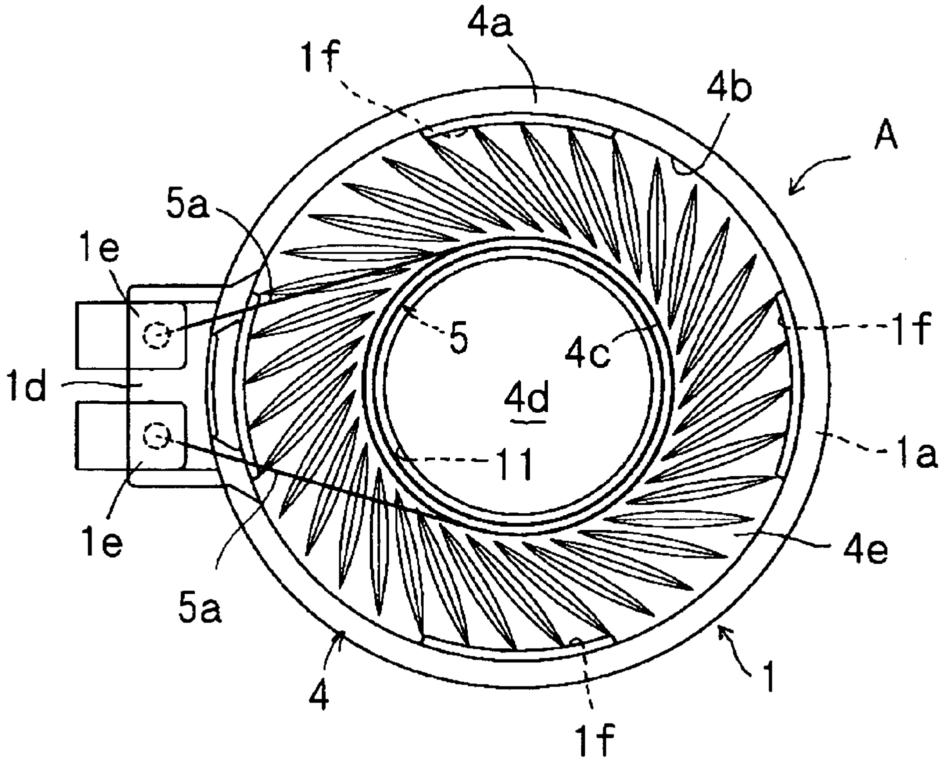
FIG. 2 is a reduced top view of the above actuator.
Figure 3:
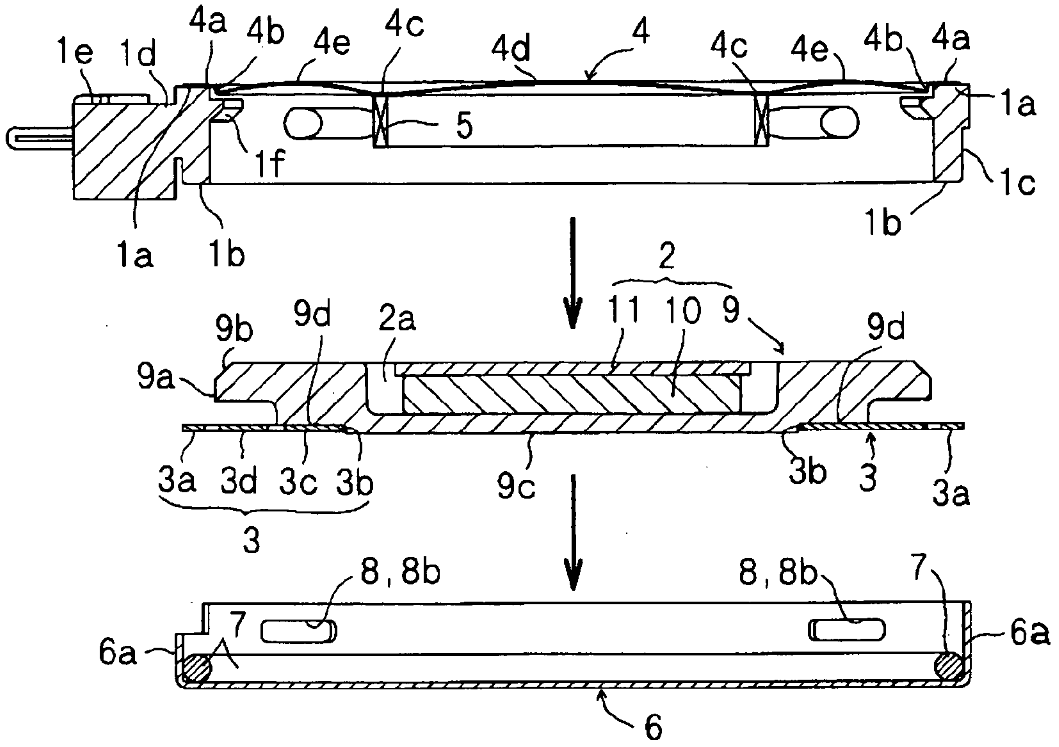
FIG. 3 is a cross-sectional front view of the actuator disassembled based on an assembly procedure.
Figure 4:
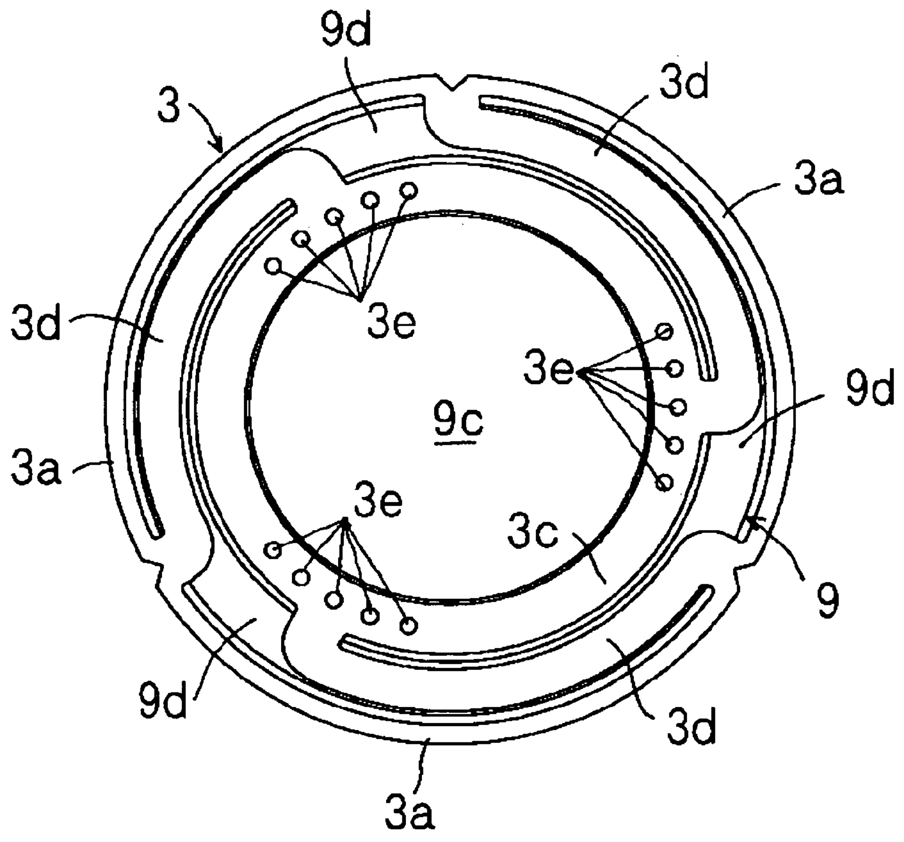
FIG. 4 is a reduced bottom view showing a magnetic circuit part mounted with a suspension.
Figure 5:
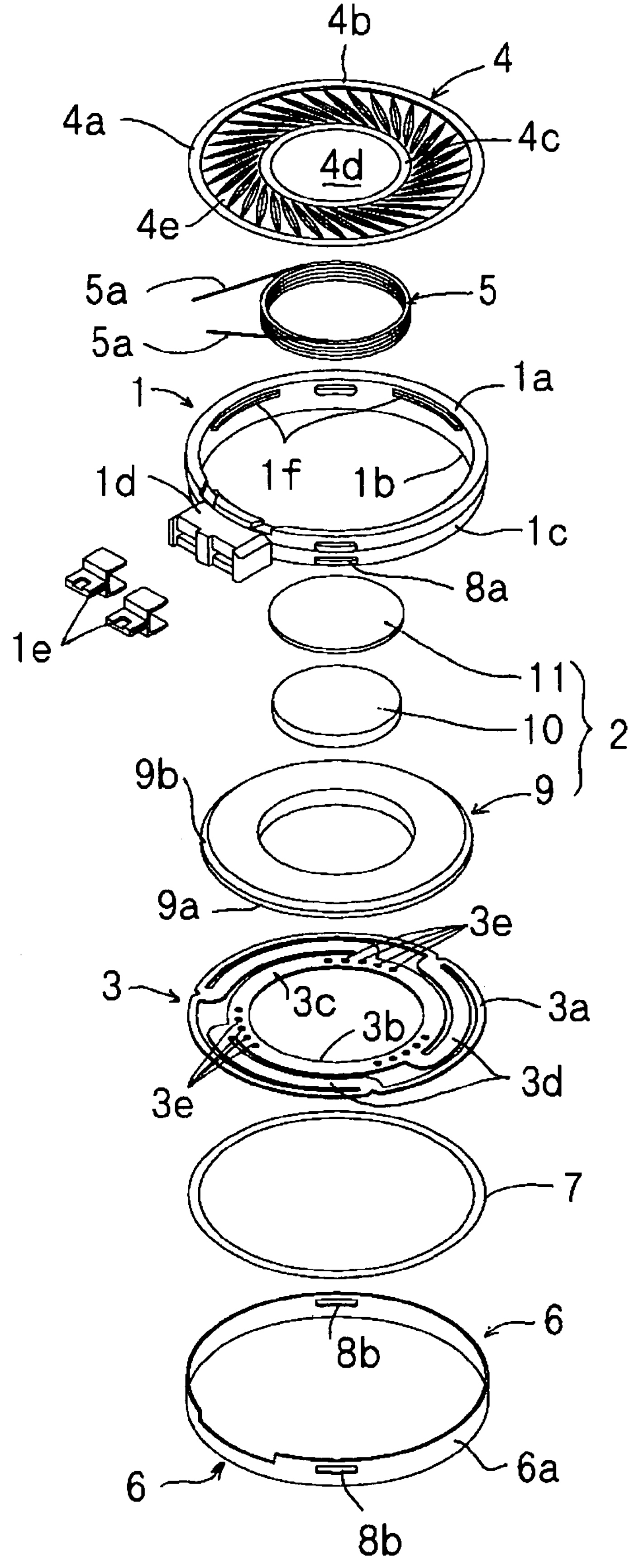
FIG. 5 is an exploded perspective view.

A Multifunction-type vibration actuator
1 Housing
2 Magnetic circuit part
2*a* Magnetic gap
3 Suspension
3*e* Securing planned position (through-hole for laser welding)
4 Diaphragm
5 Voice coil

The invention claimed is:

1. A multifunction-type vibration actuator, having a housing accommodating a magnetic circuit part, a suspension elastically supporting said magnetic circuit part in said housing, a diaphragm facing said magnetic circuit part, and a voice coil provided to said diaphragm and inserted into a magnetic gap of said magnetic circuit part, an input of a signal with a vibration frequency to said voice coil to allow vibration of said suspension secured to said magnetic circuit part to be transmitted outward through said housing, the suspension comprising:

an outer circumferential portion, a plurality of deflectable arms, each of the plurality of deflectable arms has a first end connected to the outer circumferential portion, and a second end, an annular portion connected to the second end of each of the plurality of deflectable arms, the annular portion is nested within the outer circumferential portion and is connected with the outer circumferential portion via the plurality of deflectable arms.

and a plurality of secured positions disposed on the annular portion in the vicinity of the second end of each of the plurality of deflectable arms, the plurality of secured positions are configured to be bonded to said magnetic circuit part, wherein a central vibration position of said suspension and said housing is selectable by selecting one of the plurality of securing planned position and bonding the suspension to the magnetic circuit at the selected secured planned position according to a characteristic of said suspension and according to a weight of said magnetic circuit part.

2. A multifunction-type vibration actuator according to claim 1, wherein said plurality of secured positions are through-holes configured to be selectively laser-welded so as to attach the suspension to the magnetic circuit.

3. A mobile terminal device incorporating a multifunction-type vibration actuator according to claim 1 or 2, wherein a call-out signal initiates vibration of said diaphragm and one or both mechanical vibration systems including a magnetic circuit part and a suspension in order to transmit vibration of said mechanical vibration systems throughout a device through a housing and reset of said call-out signal stops vibration of said diaphragm and said mechanical vibration systems.

* * * * *